US009027633B2

(12) United States Patent
Khodadadi

(10) Patent No.: US 9,027,633 B2
(45) Date of Patent: May 12, 2015

(54) NANOPARTICLE-ENHANCED PHASE CHANGE MATERIALS (NEPCM) WITH IMPROVED THERMAL ENERGY STORAGE

(75) Inventor: Jeyhoon M. Khodadadi, Auburn, AL (US)

(73) Assignee: Auburn University, Auburn, AL (US)

(*) Notice: Subject to any disclaimer, the term of this patent is extended or adjusted under 35 U.S.C. 154(b) by 1524 days.

(21) Appl. No.: 12/410,061

(22) Filed: Mar. 24, 2009

(65) Prior Publication Data

US 2009/0236079 A1 Sep. 24, 2009

Related U.S. Application Data

(60) Provisional application No. 61/070,588, filed on Mar. 24, 2008.

(51) Int. Cl.
| | | |
|---|---|---|
| F28D 17/00 | (2006.01) | |
| F28D 19/00 | (2006.01) | |
| C09K 5/06 | (2006.01) | |
| B82Y 30/00 | (2011.01) | |
| F28D 20/02 | (2006.01) | |
| F28F 23/00 | (2006.01) | |

(52) U.S. Cl.
CPC .............. C09K 5/063 (2013.01); B82Y 30/00 (2013.01); F28D 20/02 (2013.01); F28F 23/00 (2013.01); Y02E 60/145 (2013.01)

(58) Field of Classification Search
CPC .............................. B82Y 30/00; B22F 1/0018
USPC ........................................ 165/4, 10
See application file for complete search history.

(56) References Cited

U.S. PATENT DOCUMENTS

| | | | | |
|---|---|---|---|---|
| 6,228,904 | B1* | 5/2001 | Yadav et al. | 523/210 |
| 6,264,922 | B1* | 7/2001 | Wood et al. | 424/45 |
| 6,695,974 | B2* | 2/2004 | Withers et al. | 252/70 |
| 6,881,448 | B1* | 4/2005 | Hattori | 427/307 |
| 6,906,339 | B2* | 6/2005 | Dutta | 257/40 |
| 6,913,825 | B2* | 7/2005 | Ostafin et al. | 428/402 |
| 7,013,965 | B2* | 3/2006 | Zhong et al. | 165/185 |
| 7,049,000 | B2* | 5/2006 | Fossum et al. | 428/402 |
| 7,108,915 | B2* | 9/2006 | Adams et al. | 428/403 |
| 7,112,340 | B2* | 9/2006 | Kipp et al. | 424/489 |
| 7,175,909 | B2* | 2/2007 | Hu et al. | 428/402 |
| 7,244,784 | B2* | 7/2007 | Amick et al. | 524/556 |
| 7,253,226 | B1* | 8/2007 | Ryang | 524/492 |
| 7,550,097 | B2* | 6/2009 | Tonapi et al. | 252/512 |
| 8,048,383 | B2* | 11/2011 | Tonkovich et al. | 422/198 |
| 2003/0151030 | A1* | 8/2003 | Gurin | 252/70 |
| 2007/0148194 | A1* | 6/2007 | Amiji et al. | 424/400 |
| 2007/0154527 | A1* | 7/2007 | Myers et al. | 424/443 |
| 2007/0154559 | A1* | 7/2007 | Pai et al. | 424/489 |
| 2007/0155895 | A1* | 7/2007 | Rukavina et al. | 524/591 |
| 2007/0155935 | A1* | 7/2007 | Rukavina et al. | 528/44 |
| 2007/0158610 | A1* | 7/2007 | Hong et al. | 252/71 |
| 2007/0167554 | A1* | 7/2007 | Ryang | 524/492 |
| 2007/0190551 | A1* | 8/2007 | Mirkin et al. | 435/6 |
| 2007/0248826 | A1* | 10/2007 | Dutta | 428/403 |
| 2009/0018037 | A1* | 1/2009 | Mabuchi et al. | 977/773 |

OTHER PUBLICATIONS http://www.chemicalbook.com/ChemicalProductProperty_EN_CB4193601.htm.*

* cited by examiner

*Primary Examiner* — Ljiljana Ciric
(74) *Attorney, Agent, or Firm* — Haverstock & Owens LLP

(57) ABSTRACT

Nanoparticle-enhanced phase change materials (NEPCM) including nanoparticles dispersed with a base phase change material and that exhibit enhanced thermal conductivity in comparison to the base phase change material.

17 Claims, 13 Drawing Sheets

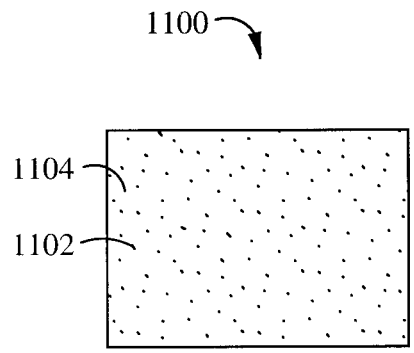 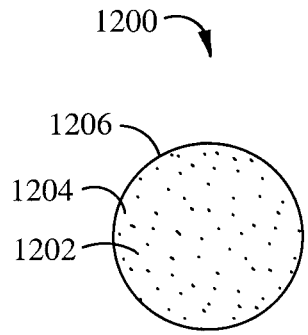
Fig. 11  Fig. 12
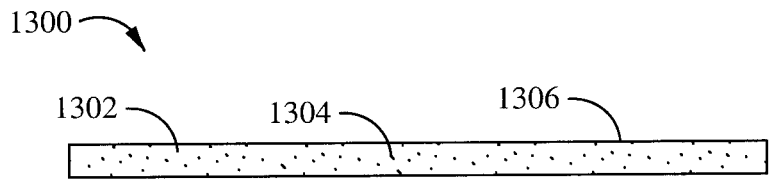
Fig. 13
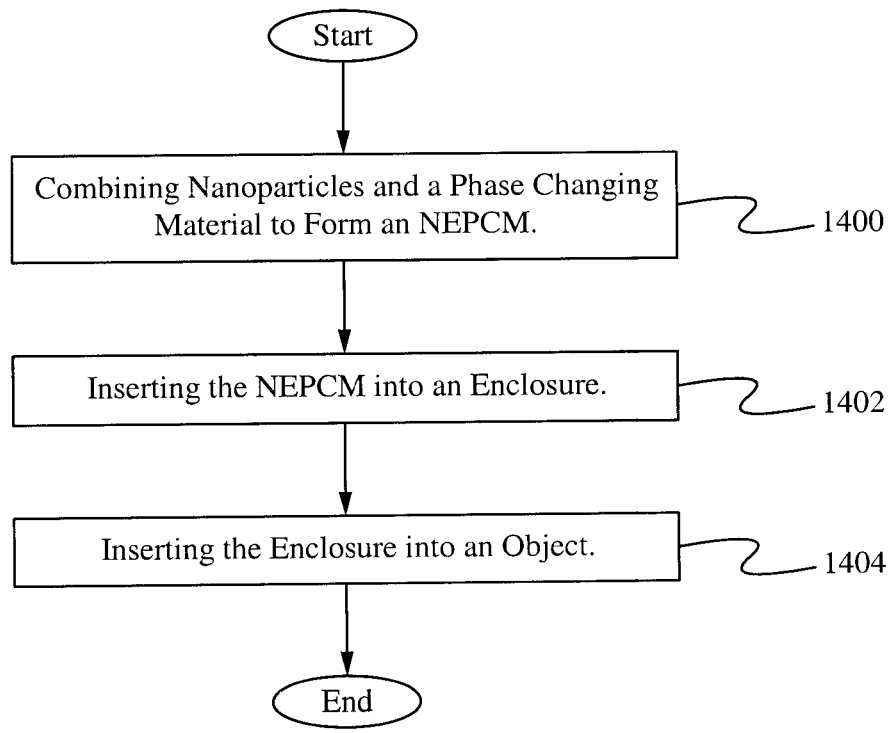
Fig. 14

NANOPARTICLE-ENHANCED PHASE CHANGE MATERIALS (NEPCM) WITH IMPROVED THERMAL ENERGY STORAGE

CROSS-REFERENCE TO RELATED APPLICATIONS

This application claims the benefit of U.S. Provisional Patent Application Ser. No. 61/070,588, filed Mar. 24, 2008 and entitled "NANOPARTICLE-ENHANCED PHASE CHANGE MATERIALS (NEPCM) WITH GREAT POTENTIAL FOR IMPROVED THERMAL ENERGY STORAGE"; which is hereby incorporated by reference in its entirety for all purposes.

FIELD OF THE INVENTION

The present invention relates to the field of phase change materials. More specifically, the present invention relates to nanoparticle-enhanced phase change materials.

BACKGROUND OF THE INVENTION

Early work on thermal control and energy storage using phase change materials (PCM) is able to be directly linked to the fast-paced developments in aeronautics and electronics in the middle of the twentieth century that was followed by the Space Program. A NASA document entitled "A Design Handbook for Phase Change Thermal Control and Energy Storage Devices" and authored by Humphries and Griggs, NASA Technical Paper 1074, (1977) provides a good overview of the state-of-the-art at that time and is widely referenced in a number of papers on thermal storage and PCM. Humphries and Griggs (1977) discuss a number of earlier works on utilization of metallic "fillers" to enhance the thermal conductivity of PCM. Understandably so, stationary inserts were widely adopted. These filler materials included metallic wool, foam and honeycomb that were introduced into a variety of fusible materials. The stationary inserts are limited in their uses due to size, lack of flexibility and other reasons.

SUMMARY OF THE INVENTION

Improved functionality of phase change materials (PCM) through dispersion of nanoparticles is described. The resulting nanoparticle-enhanced phase change materials (NEPCM) exhibit enhanced thermal conductivity in comparison to the base material. Starting with steady state natural convection within a differentially-heated square cavity that contains a nanofluid (water plus copper nanoparticles), the nanofluid is allowed to undergo solidification. Partly due to increase of thermal conductivity and also lowering of the latent heat of fusion, higher heat release rate of the NEPCM in relation to the conventional PCM is observed. The predicted increase of the heat release rate of the NEPCM is a clear indicator of its great potential for diverse thermal energy storage applications.

In one aspect, a free-form composition for improving thermal energy storage comprises nanoparticles and a phase change material. The nanoparticles are selected from the group consisting of copper, aluminum, copper oxide, aluminum oxide and titanium oxide. The phase change material is selected from the group consisting of water, cyclohexane, dodecane and gel oil.

In another aspect, a system for improving thermal energy storage comprises a solution comprising nanoparticles and a phase change material and a storage mechanism for storing the solution. The nanoparticles are selected from the group consisting of copper, aluminum, copper oxide, aluminum oxide and titanium oxide. The phase change material is selected from the group consisting of water, cyclohexane, dodecane and gel oil. The solution is free-form. The storage mechanism is selected from the group consisting of a bead, a flat enclosure, a square enclosure and a tube enclosure. A material of the storage mechanism is selected from the group consisting of plastic, rubber, metal and glass.

In another aspect, a method of utilizing a nanoparticle-enhanced phase change material (NEPCM), the method comprises combining nanoparticles and a phase change material to form the NEPCM and inserting the NEPCM into an enclosure. The method further comprises inserting the enclosure into an object. The object is selected from the group consisting of construction material, clothing, automobile components, furniture, appliances, electronics and containers. The nanoparticles are selected from the group consisting of copper, aluminum, copper oxide, aluminum oxide and titanium oxide. The phase change material is selected from the group consisting of water, cyclohexane, dodecane and gel oil. The NEPCM is free-form. The enclosure is selected from the group consisting of a bead, a flat enclosure, a square enclosure and a tube enclosure. A material of the enclosure is selected from the group consisting of plastic, rubber, metal and glass.

In another aspect, a system including improved thermal energy storage comprises a solution comprising nanoparticles and a phase change material, a storage mechanism configured for storing the solution and an object containing the storage mechanism. The nanoparticles are selected from the group consisting of copper, aluminum, copper oxide, aluminum oxide and titanium oxide. The phase change material is selected from the group consisting of water, cyclohexane, dodecane and gel oil. The solution is free-form. The storage mechanism is selected from the group consisting of a bead, a flat enclosure, a square enclosure and a tube enclosure. A material of the storage mechanism is selected from the group consisting of plastic, rubber, metal and glass. The object is selected from the group consisting of construction material, clothing, automobile components, furniture, appliances and electronics and containers.

BRIEF DESCRIPTION OF THE DRAWINGS

FIG. 11 illustrates a nanoparticle-enhanced phase change material.

FIG. 12 illustrates an exemplary contained nanoparticle-enhanced phase change material.

FIG. 13 illustrates an exemplary contained nanoparticle-enhanced phase change material.

FIG. 14 illustrates a flowchart of a method of utilizing a nanoparticle-enhanced phase change material.

DETAILED DESCRIPTION OF THE PREFERRED EMBODIMENT

Figure 1:
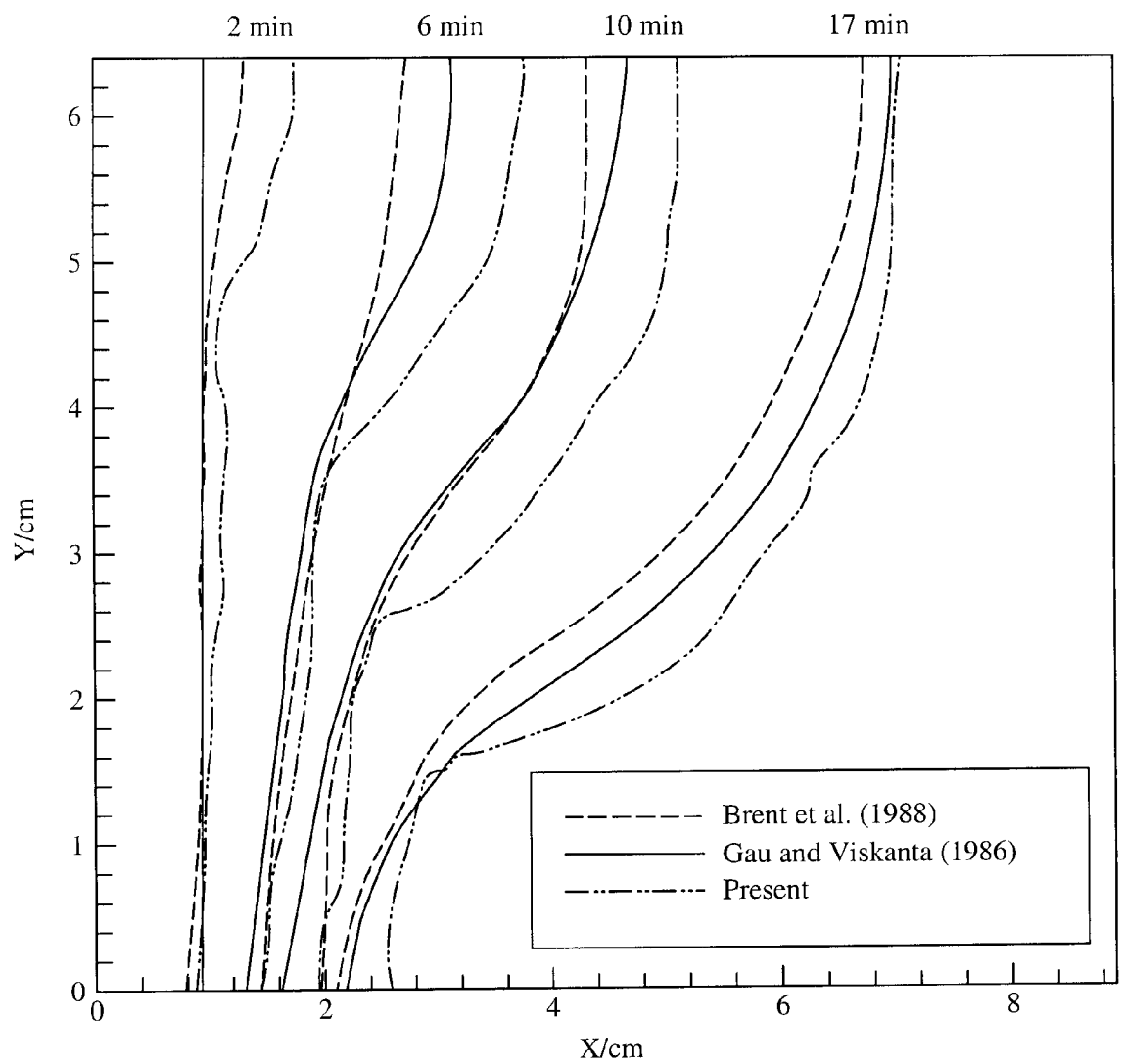
FIG. 1 illustrates a graph of progress of the melt front with time: comparison among the predictions of Brent et al. (Enthalpy-porosity technique for modeling convection-diffusion phase change: application to the melting of a pure metal, Numer. Heat Transf. 13 (3) (1988) 297-318), a 42×32 grid described herein and experimental data of Gau and Viskanta (Melting and solidification of a pure metal on a vertical wall, J. Heat Transfer 108 (1) (1986) 174-181).

Utilization of naturally-occurring or fabricated nanoparticles (diameters less than 50 nm) is able to be used for new technological innovations in many fields. Although others have investigated using ultra-fine particles in liquids and nanofluids, the exploitation of the thermal properties of nano-materials in preparation, tailoring and development of functionality-tested nanoparticle-enhanced phase change materials (NEPCM) through dispersion of nanoparticles is a new development.

The following nomenclature is used throughout:
$d_p$ diameter of spherical nanoparticles, m
k thermal conductivity, W/mK
L latent heat of fusion, J/kg
Ste Stefan number, e.g. $c_p \Delta T/L$
Greek symbols:
$\phi$ volume fraction of solid particles
$\lambda$ volume fraction of the nanofluid
$\tau$ freezing time, s
Subscripts
f base fluid
nf nanofluid
s solid
0 stagnant
1, 2 related to Grashof numbers $10^4$ and $10^5$, respectively.

Considering a nanofluid as a continuous media with thermal equilibrium between the base fluid and the solid nanoparticles, the governing equations are:

Continuity:

$$\frac{\partial u}{\partial x} + \frac{\partial v}{\partial y} = 0, \tag{1}$$

X-momentum equation:

$$\frac{\partial v}{\partial t} + u \frac{\partial v}{\partial x} + v \frac{\partial v}{\partial y} = \frac{1}{\rho_{nf}} \left( -\frac{\partial p}{\partial x} + \mu_{nf} \nabla^2 u + (\rho \beta)_{nf} g_x (T - T_{ref}) \right), \tag{2}$$

Y-momentum equation:

$$\frac{\partial v}{\partial t} + u \frac{\partial v}{\partial x} + v \frac{\partial v}{\partial y} = \frac{1}{\rho_{nf}} \left( -\frac{\partial p}{\partial y} + \mu_{nf} \nabla^2 v + (\rho \beta)_{nf} g_y (T - T_{ref}) \right), \tag{3}$$

Energy equation:

$$\frac{\partial T}{\partial t} + u \frac{\partial T}{\partial x} + v \frac{\partial T}{\partial y} = \frac{1}{\rho_{nf}} \left[ \frac{(k_{nf0} + k_d)}{(\rho C_p)_{nf}} \frac{\partial T}{\partial x} \right] + \frac{\partial}{\partial y} \left[ \frac{(k_{nf0} + k_d)}{(\rho C_p)_{nf}} \frac{\partial T}{\partial y} \right], \tag{4}$$

The density of the nanofluid is given by:

$$\rho_{nf} = (1-\phi)\rho_f + \phi \rho_s, \tag{5}$$

whereas the heat capacitance of the nanofluid and part of the Boussinesq term are:

$$(\rho c_p)_{nf} = (1-\phi)(\rho c_p)_f + \phi(\rho c_p)_s, \tag{6}$$

$$(\rho \beta)_{nf} = (1-\phi)(\rho \beta)_f + \phi(\rho \beta)_s, \tag{7}$$

with $\phi$ being the volume fraction of the solid particles and subscripts f, nf and s stand for base fluid, nanofluid and solid, respectively. The viscosity of the nanofluid containing a dilute suspension of small rigid spherical particles is given by:

$$\mu_{nf} = \frac{\mu_f}{(1-\phi)^{2.5}}, \tag{8}$$

whereas the thermal conductivity of the stagnant (subscript 0) nanofluid is:

$$\frac{k_{nf0}}{k_f} = \frac{k_s + 2k_f - 2\phi(k_f - k_s)}{k_s + 2k_f + \phi(k_f - k_s)}. \tag{9}$$

The effective thermal conductivity of the nanofluid is:

$$k_{eff} = k_{nf0} + k_d, \tag{10}$$

and the thermal conductivity enhancement term due to thermal dispersion is given by:

$$k_d = C(\rho c_p)_{nf} \sqrt{u^2 + v^2} \phi d_p. \tag{11}$$

The empirically-determined constant C is evaluated.

Taking the lower left corner of the cavity as the origin of the coordinate system, $g_x = 0$ and $g_y = -g$. One particular nanofluid of interest is solid copper nanoparticles ($d_p = 10$ nm) suspended in water as the base fluid. Temperature difference of the two walls was 10° C. ($T_H = 283.15$ and $T_C = 273.15$K). The pertinent thermophysical properties are given in Table 1.

The boundary conditions are:

$$u = v = \frac{\partial T}{\partial y} = 0 \quad \text{at} \quad y = 0, H \quad \text{and} \quad 0 \le x \le H, \quad (12)$$

$$u = v = 0, T = T_H \quad \text{at} \quad x = 0 \quad \text{and} \quad 0 \le y \le H,$$

$$u = v = 0, T = T_C \quad \text{at} \quad x = H \quad \text{and} \quad 0 \le y \le H.$$

Starting at time t=0, the temperatures of both active left and right walls were lowered by the same amount such that the cold right wall was held 10° C. below the freezing temperature of the base fluid. Consequently, the nanofluid will start freezing on the right wall and the solid front travels to the left. The remaining boundary conditions were unchanged in comparison to the conditions prior to t=0.

TABLE 1

Thermophysical properties of the copper nanoparticles, water ($\phi = 0$) and nanofluids with solid copper nanoparticle volume fractions ($\phi$) equal to 0.1 and 0.2.

|  | Copper nanoparticles | Base fluid $\phi = 0$ | Nanofluid 1 $\phi = 0.1$ | Nanofluid 2 $\phi = 0.2$ |
| --- | --- | --- | --- | --- |
| $\rho[kg/m^3]$ | 8954 | 997.1 | 1792.79 | 2588.48 |
| $\mu[Pa\,s]$ | — | $8.9 \times 10^{-4}$ | $1.158 \times 10^{-3}$ | $1.555 \times 10^{-3}$ |
| $C_p[J/kg\,K]$ | 383 | 4179 | 2283.107 | 1552.796 |
| $k[W/m\,K]$ | 400 | 0.6 | 0.8 | 1.04748 |
| $\alpha[m^2/s]$ | $1.17 \times 10^{-4}$ | $1.44 \times 10^{-7}$ | $1.95 \times 10^{-7}$ | $2.6 \times 10^{-7}$ |
| $\beta[1/K]$ | $1.67 \times 10^{-5}$ | $2.1 \times 10^{-4}$ | $1.13 \times 10^{-4}$ | $7.63 \times 10^{-5}$ |
| $L[J/kg]$ | — | $3.35 \times 10^5$ | $1.68 \times 10^5$ | $1.03 \times 10^5$ |
| Pr | — | 6.2 | 3.31 | 2.3 |
| Ste | — | 0.125 | 0.136 | 0.150 |
| $\tau_1[s]$ | — | 2950 | 2000 | 1300 |
| $\tau_2[s]$ | — | 3000 | 2000 | 1400 |

Computational Methodology

The SIMPLE (semi-implicit method for pressure-linked equations) method within version 6.2.16 of the commercial code FLUENT (commercial computational fluid dynamics code) was utilized for solving the governing equations. For all of the cases reported here, uniform grid spacings for both x and y directions were utilized. The time step for integrating the temporal derivatives was set to 1s. The QUICK (Quadratic Upwind Interpolation for Convective Kinematics) differencing scheme was used for solving the momentum and energy equations, whereas the PRESTO (pressure staggering option) scheme was adopted for the pressure correction equation. The under-relaxation factors for the velocity components, pressure correction, thermal energy and liquid fraction were 0.5, 0.3, 1 and 0.9, respectively. In order to satisfy convergence criteria ($10^{-7}$ for continuity and momentum, and $10^{-9}$ for thermal energy), the number of iterations for every time step was between 400 and 700. A single-domain enthalpy-porosity formulation that treats different phases as porous media was utilized. In effect, Darcy Law damping terms of the form $$\frac{A(1-\lambda)^2}{\lambda^3} V_i$$

with i =x and y were added to the momentum equations. The term $\lambda$, stands for nanofluid volume fraction at a given point that is equal to unity for the fluid phase, whereas it becomes zero upon freezing. The mushy zone constant (A) was set to $10^5$ kg/m$^3$s. The enthalpy of the material is composed of the sensible enthalpy and the latent heat of fusion. The latent heat that is evaluated using:

$$(\rho L)_{nf} = (1-\phi)(\rho L)_f, \quad (13)$$

is liberated proportionately to the nanofluid volume fraction that is defined using a lever rule between the liquidus and solidus temperatures.

Benchmarking the Models

The predicted progress of the melt front with time as reported and measured by others is compared to the present computed data in FIG. 1. The qualitative trends among the approaches are agreeable, whereas the present computations suggest a greater role for natural convection indicated by the uneven melting in the top half of the cavity compared to the bottom half.

Figure 2:
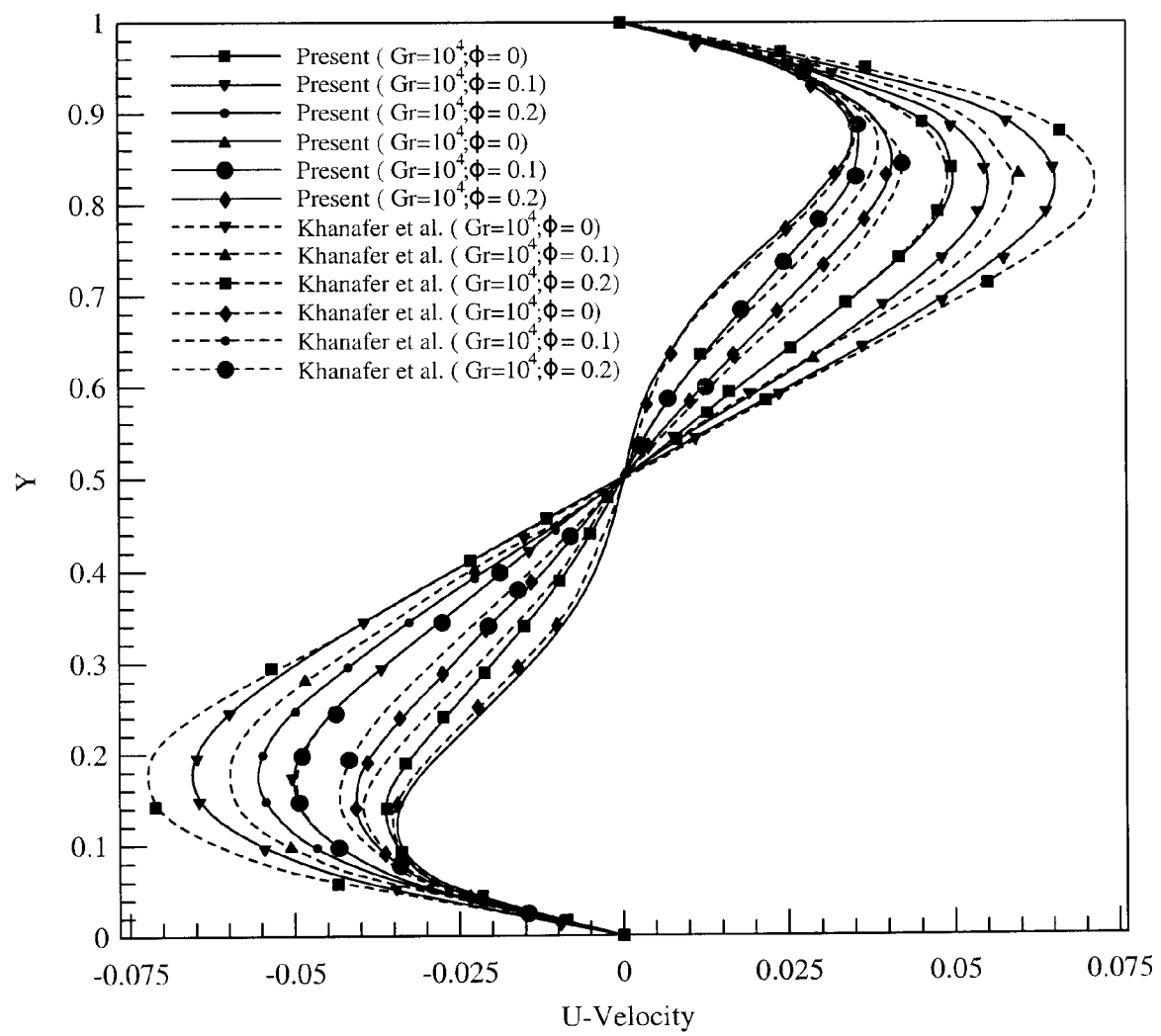
FIG. 2 illustrates a graph of a comparison of the predicted horizontal velocity component on the vertical mid-plane of the square cavity for the present study and those of Khanafer et al. (Buoyancy-driven heat transfer enhancement in a two-dimensional enclosure utilizing nanofluids, Int. J. Heat Mass Transfer 46 (19) (2003) 3639-3653) with Gr=$10^4$ and $10^5$.

The results of others were used to benchmark the present computations for the case of natural convection of nanofluids within a differentially-heated square cavity. The predicted horizontal velocity component on the vertical mid-plane of the square cavity with an 81×81 grid system and that of Khanafer et al. are compared in FIG. 2 for Gr=$10^4$ and $10^5$. Regardless of the volume fraction of the nanoparticles, the well-established trends of the horizontal fluid velocity exhibiting accelerated flow near the horizontal walls and weak flow in the center of the cavity point to the observation that nanofluids behave more like a fluid as opposed to the flow of mm- or micron-size suspensions. The comparison for the cases of buoyancy-driven convection of a pure fluid (zero volume fraction) for the two Grashof numbers is excellent. According to Khanafer et al., the dimensionless velocity was related to the inverse of the temperature difference between the two active walls. Consequently, the dimensionless velocity for Gr=$10^5$ is lower compared to the corresponding Gr=$10^4$ case. For a fixed Grashof number, as the loading of the nanoparticles is increased, "irregular and random" (Khanafer et al.) motion of the nanoparticles promote greater momentum and energy transport throughout the cavity. Consequently, the extra thermal conductivity due to dispersion is enhanced.

Freezing of NEPCM

Figure 3A:
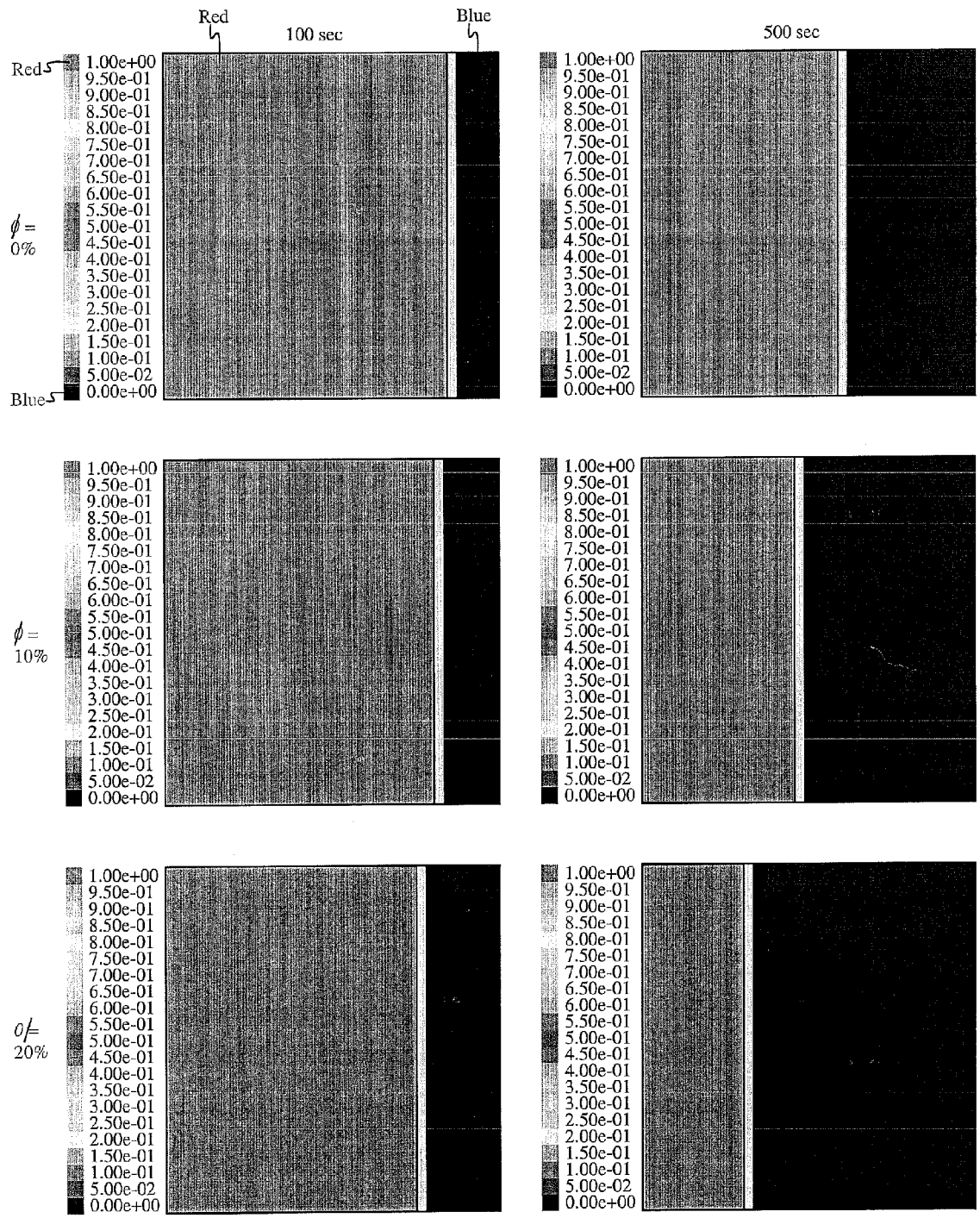
FIGS. 3A-B illustrate a set of colorized contours of the volume fraction of the nanofluid ($\lambda$) at various time instants during the freezing of water with copper nanoparticles for an initial Gr=$10^4$ (solid particle volume fractions of 0, 0.1 and 0.2 and Ste=0.125, 0.136 and 0.150, respectively).
Figure 3B:
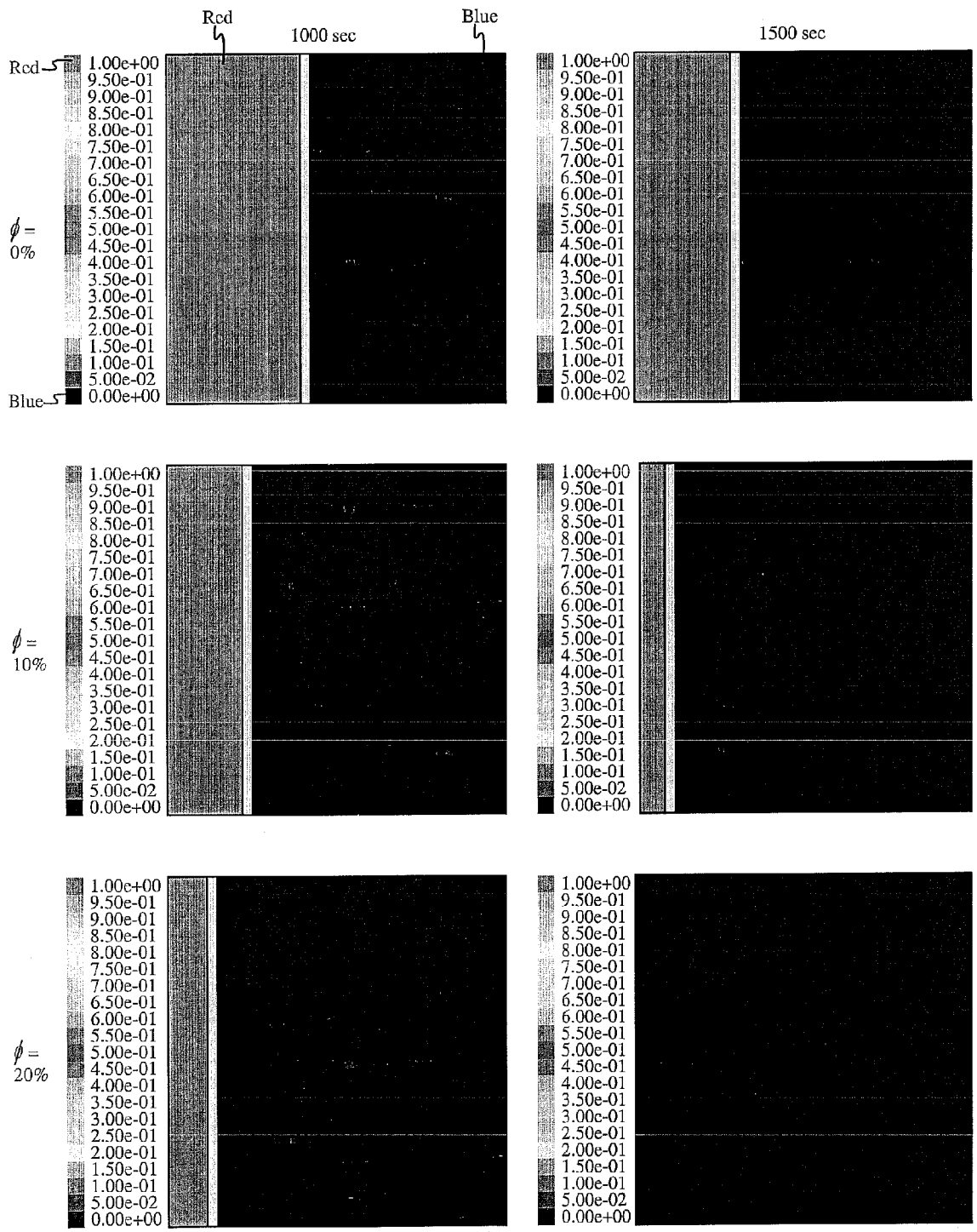

Improved functionality of nanoparticle-enhanced phase change materials (NEPCM) compared to the base fluid is crucial. Starting with steady natural convection within a water-copper nanofluid that is inside a differentially-heated square cavity, freezing of the NEPCM was investigated. The temperatures of the left and right walls were lowered by 10° C. In effect, the cold right wall was held 10° C. lower than the freezing temperature of the base fluid (273.15K). Consequently, the nanofluid will start freezing on the right wall and the solid travels to the left. The other boundary conditions remained unchanged. Three solid particle volume fractions of 0, 0.1 and 0.2 were considered for two initial Grashof numbers of $10^4$ and $10^5$. The pertinent properties are given in Table 1, and the corresponding Stefan numbers for the three solid particle volume fractions of 0, 0.1 and 0.2 were 0.125, 0.136 and 0.150, respectively. Colorized contours of the volume fraction of the nanofluid, e.g. $\lambda$ (0 and 1 for solid and liquid phases, respectively) during freezing of the NEPCM at various time instants are shown in FIGS. 3A-B for an initial Grashof number of $10^4$. The time instants in FIGS. 3A-B are 100, 500, 1000 and 1500 s. The color red is used to identify the liquid phase, whereas the color blue is indicative of the frozen solid phase. In general, the sharp liquid-solid interface is nearly vertical with a mild misalignment toward the colder wall early on, thus favoring a longer wetted length on the top insulated wall. This is able to be attributed to the buoyancy-driven convection in the cavity that was already at full strength at t=0 in the form of a clockwise (CW) rotating vortex which is generated next to the left wall (discussed below). Observations on the instantaneous volume of the frozen solid phase and the shape of the interface for the case of freezing of pure water (φ=0) are in general agreement with findings of others. For this Grashof number (Gr=10$^4$), it is observed that as the solid particle volume fraction is raised, the NEPCM will freeze more rapidly. This is due to the enhanced thermal conductivity of the nanofluid and smaller value of the latent heat, to be further discussed below.

Figure 4:
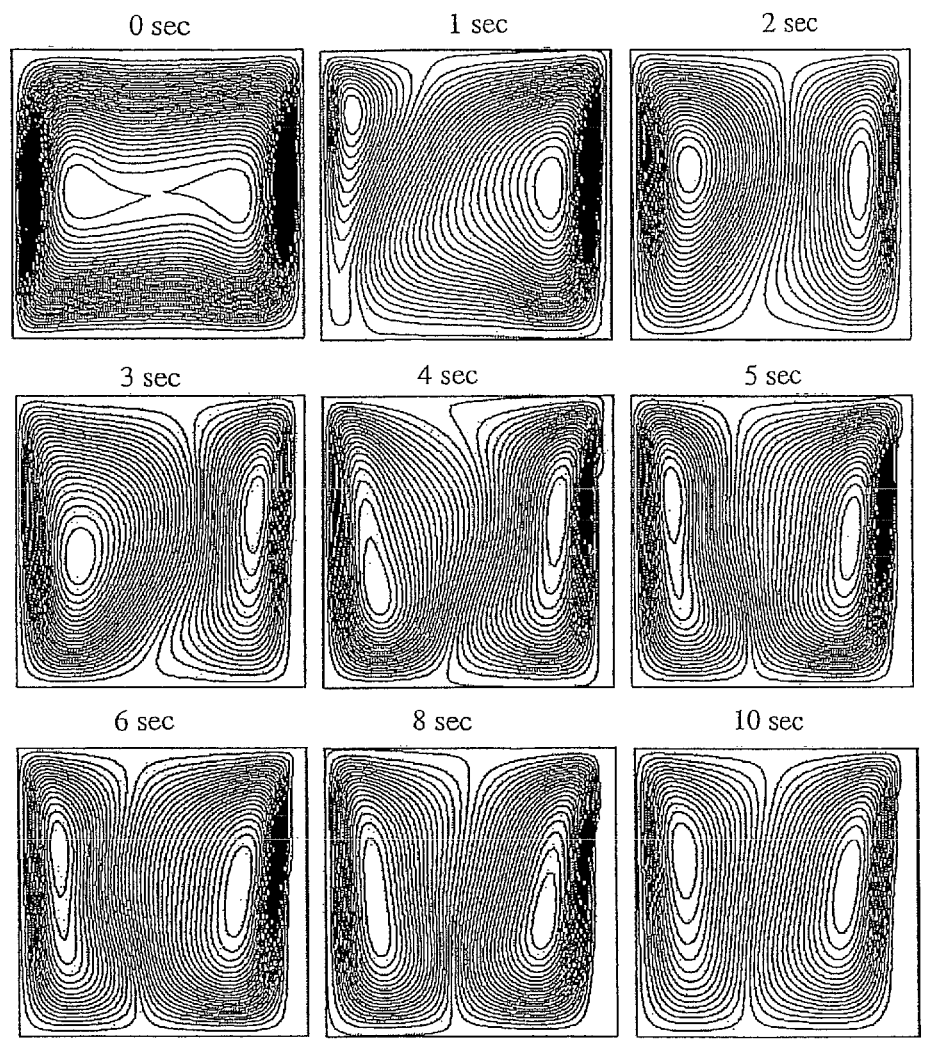
FIG. 4 illustrates streamline patterns at various time instants for the initial 10 s during the freezing of water with copper nanoparticles (solid particle volume fraction of 0.2) for an initial Gr=$10^5$ and Ste=0.150.

The instantaneous streamlines within the nanofluid for the initial 10 s during the freezing of NEPCM for an initial Gr=10$^5$, Ste=0.150 and a solid particle volume fraction of 0.2 are shown in FIG. 4. The streamlines at t=0 correspond to a similar case studied by Khanafer et al. and a clockwise (CW) rotating vortex is clearly observed. As a result of the sudden lowering of the temperatures of the two active walls at t=0, the CW rotating vortex diminishes in strength and spatial coverage due to formation of a counter-clockwise (CCW) rotating vortex next to the left wall. The generation of the dual-vortex flow pattern was examined in greater detail by lowering the time step to 0.1 s for this case. Note that the formation, growth and equilibration of the CCW vortex during the initial 10 s involves a dynamic interaction with the initially strong CW vortex. At the t=10 s instant, two vortices rotating in opposite directions and nearly equal in size are observed squeezed between the left wall and a thin frozen layer next to the right wall. For the remainder of the freezing process, the dual-vortex structure will persist however due to the leftward movement of the freezing front, the vortices will shrink in coverage space and their strength will decay. The actual Grashof number for this unsteady freezing problem decreases with time due to the continuous shrinking of the distance between the left wall and the liquid-solid interface.

Figure 5:
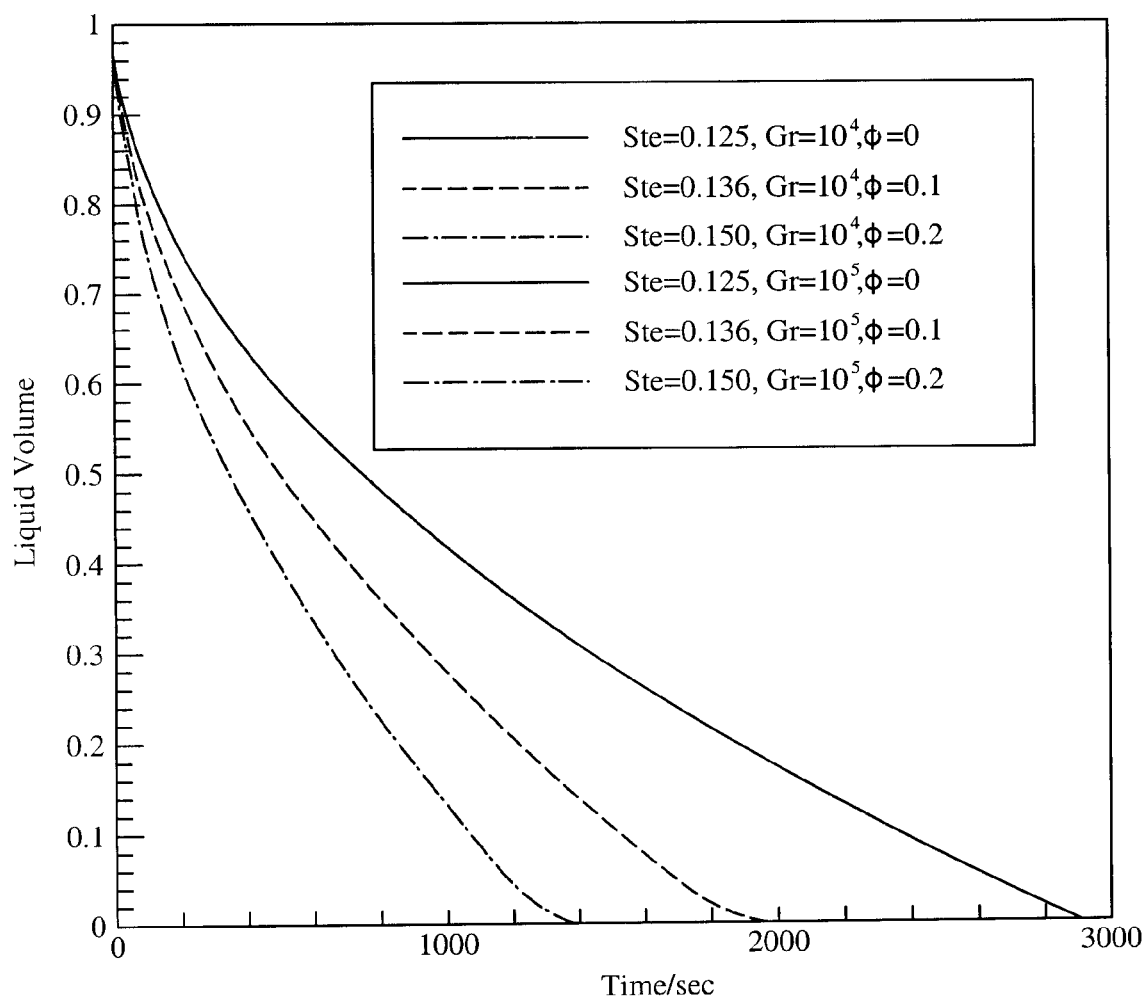
FIG. 5 illustrates a graph of instantaneous volume of the nanofluid within the square cavity.

The instantaneous dimensionless volume of the nanofluid within the square cavity, e.g.:

$$\text{Liquid Volume }(t) = \int_{x=0}^{H}\int_{y=0}^{H} \lambda(x,y,t)dxdy/H^2, \quad (14)$$

is presented in FIG. 5 for all of the cases that were investigated. The liquid volume that continuously decreases from the start of the freezing exhibits little sensitivity to the value of the initial Grashof number except near the conclusion of the freezing process. On the other hand, the volume of the nanofluid is strongly dependent on the solid particle volume fraction of the dispersed nanoparticles. The freezing times for pure water and copper-water nanofluids for initial Grashof numbers 10$^4$ and 10$^5$ are summarized in Table 1. For a given initial Grashof number, as the solid particle volume fraction is raised the freezing time is lowered. This is due to the enhanced thermal conductivity of the nanofluid in comparison to that of the base liquid. At the same time, due to lowering of the latent heat of fusion, less energy per unit mass of the nanofluid is needed for freezing this specific NEPCM. The observed higher heat release rate of the NEPCM is a clear indicator of its great potential for thermal energy storage applications.

Given proper suspension of nanoparticles within conventional phase change materials such as water, it is shown that NEPCMs have great potential for demanding thermal energy storage applications. Specifically, the high heat release rate of the NEPCM in relation to the conventional PCM and its higher thermal conductivity point to its promise for greater utilization in diverse energy sectors.

In the following, results of an analytic/integral formulation of a 1-D freezing problem of any PCM in a finite slab are illustrated.

Thermophysical Property of Composites

The properties of the resulting PCM/nanoparticle composites in both liquid and solid phase depend on the properties of the constituents. These properties were determined using the following relations, with subscript j standing for l and s. The density of a PCM/nanoparticle composite is given by:

$$\rho_j = (1-\phi)\rho_{j_{pcm}} + \phi\rho_p, \quad (15)$$

with φ being the volume fraction of the solid particles. The thermal conductivity of the composites is evaluated using:

$$\frac{k_j}{k_{jpcm}} = \frac{k_p + 2k_{jpcm} - 2\phi(k_{jpcm} - k_p)}{k_p + 2k_{jpcm} + \phi(k_{jpcm} - k_p)}, \quad (16)$$

whereas the heat capacitance of the composite is:

$$(\rho C_p)_j = (1-\phi)(\rho C_p)_{jpcm} + \phi(\rho C_p)_p, \quad (17)$$

The latent heat is evaluated using:

$$(\rho L)_j = (1-\phi)(\rho L)_{jpcm}. \quad (18)$$

Finally, the thermal diffusivity is obtained using:

$$a_j = \frac{k_j}{(\rho C_p)_j}. \quad (19)$$

The thermophysical properties of possible PCMs and nanoparticles are summarized in Tables 2 and 3.

TABLE 2

Thermophysical properties of water and cyclohexane.

| | Water (T$_m$ = 273.15K; L = 334,000 J/kg) | | Cyclohexane (T$_m$ = 279.5K; L = 32,557 J/kg) | |
|---|---|---|---|---|
| | Liquid | Solid | Liquid | Solid |
| ρ[kg/m$^3$] | 997 | 919 | 789.4 | 856.1 |
| C$_p$[J/kg K] | 4,180 | 2,000 | 1,762.8 | 1,800 |
| k[W/m K] | 0.61 | 2.3 | 0.127 | 0.1359 |
| α[m$^2$/s] | 1.437 × 10$^{-7}$ | 1.2514 × 10$^{-6}$ | 9.1265 × 10$^{-8}$ | 8.8256 × 10$^{-8}$ |

TABLE 3

Thermophysical properties of Al$_2$O$_3$, Cu, CuO and TiO$_2$ nanoparticles.

| | Aluminum | Copper | Copper Oxide | Titanium Oxide |
|---|---|---|---|---|
| ρ[kg/m$^3$] | 3,880 | 8,933 | 6,510 | 4,175 |
| C$_p$[J/kg K] | 792 | 385 | 540 | 692 |
| k[W/m K] | 42.34 | 401 | 18 | 8.4 |
| α[m$^2$/s] | 1.3778 × 10$^{-5}$ | 1.166 × 10$^{-4}$ | 5.1203 × 10$^{-6}$ | 2.9075 × 10$^{-6}$ |

Results and Discussion

Thermophysical properties of the NEPCM composites were determined using relations 15-18 and Tables 2 and 3 for volume fractions of 0.01, 0.02, 0.05 and 0.1. The Stefan numbers for water-based composites ranged between 0.12 and 0.14, where for cyclohexane-based composites, the range was between 1.11 and 1.44. The subcooling numbers for the water and cyclohexane composites were 0.425 and 0.494, respectively. These corresponded to an initial temperature of 300 K, while keeping the cold side of the slab 20 degrees centigrade below the melting temperature of the PCM. In the following, the effects of the thermal conductivity ratio of the liquid to solid phases and thermal diffusivity ratio of the liquid to solid phases on the freezing times of the composites are presented.

Effect of the Thermal Conductivity Ratio

Figure 6:
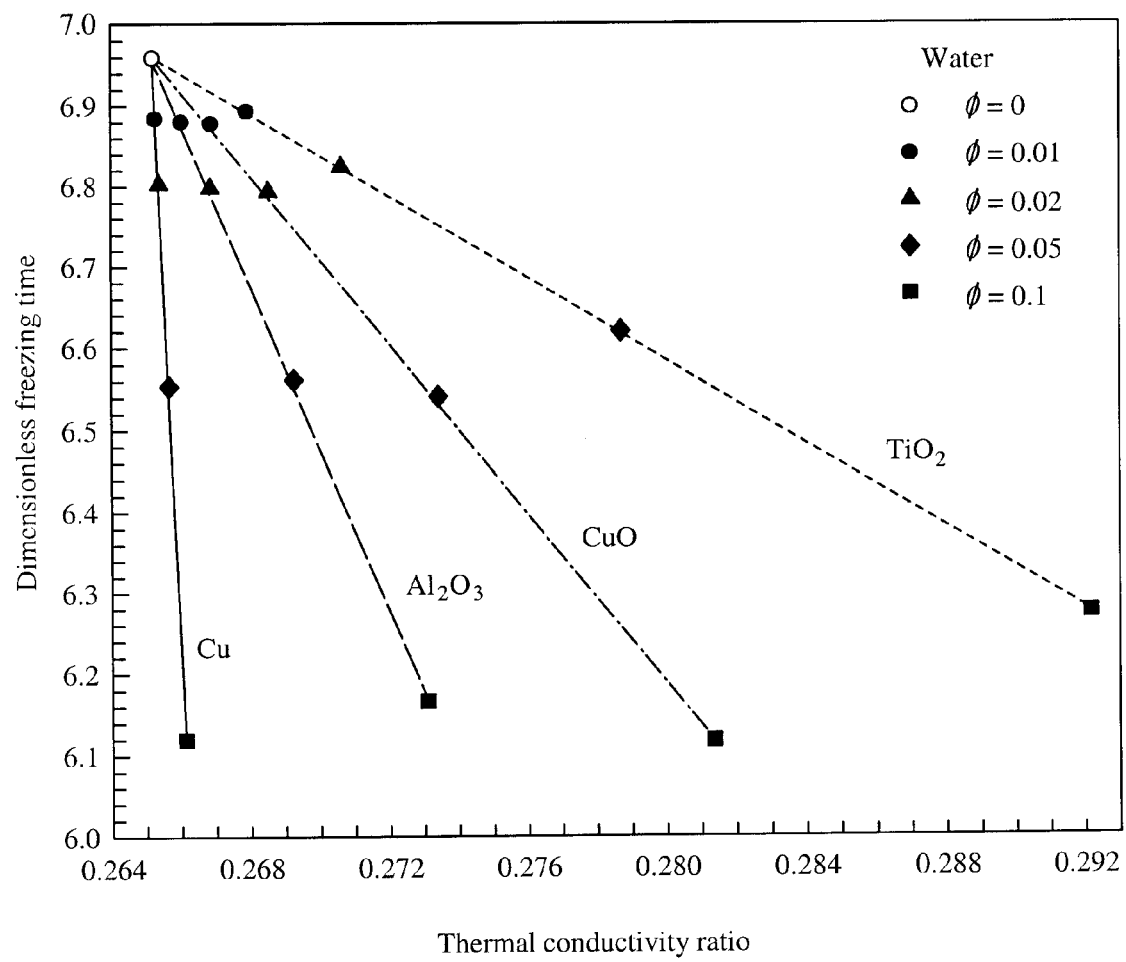
FIG. 6 illustrates a graph of freezing time versus thermal conductivity ratio with water as a base PCM.
Figure 7:
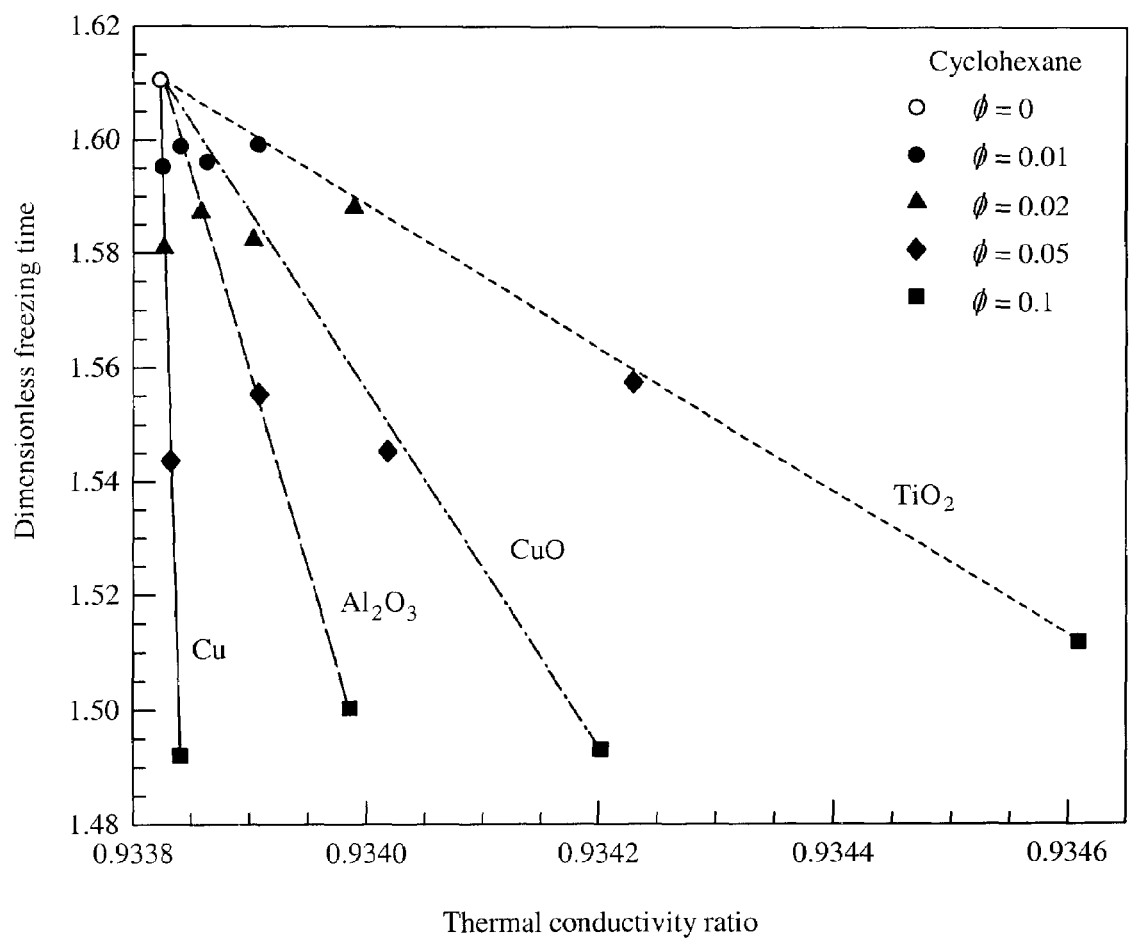
FIG. 7 illustrates a graph of freezing time versus thermal conductivity ratio with cyclohexane as a base PCM.

The dimensionless freezing times of PCM/nanoparticle composites as a function of the thermal conductivity ratio of the liquid to solid phases for water and cyclohexane as the base PCM are presented in FIGS. 6 and 7, respectively. An open symbol is used for the case of a particle-free PCM, whereas solid symbols are used for volume fractions of 0.01, 0.02, 0.05 and 0.1. For a given filler material (alumina, copper, copper oxide and titanium oxide), dashed lines are drawn through the appropriate computed quantities to identify the specific PCM/nanoparticle composite. Regardless of the base PCM (water or cyclohexane) and for a fixed volume fraction, the smallest and greatest variations of the thermal conductivity ratio are realized by the high (copper) and low (titanium oxide) thermal conductivity suspensions, respectively. As the volume fraction of a filler material that is suspended in a base PCM is raised, the thermal conductivity ratio of the liquid to solid increases. The most interesting finding is that for a given base PCM (water in FIG. 6 and cyclohexane in FIG. 7) and constant value of the volume fraction, the dimensionless freezing time is nearly constant and independent of the nature of the suspended material. The average values of the dimensionless freezing times for a given value of the volume fraction of the particles suspended in water and cyclohexane are summarized in Table 3. In addition, percentage of change in freezing time in comparison to the case of a particle-free PCM is provided. It is shown that regardless of the type of suspended particles, 10% by particle volume composites of water and cyclohexane will exhibit expedited freezing times by 11.36 and 6.5 percent, respectively.

| Base PCM | φ = 0 | φ = 0.01 | φ = 0.02 | φ = 0.05 | φ = 0.1 |
|---|---|---|---|---|---|
| Water | 6.9619 | 6.8859 (1.092%) | 6.8083 (2.206%) | 6.5706 (5.620%) | 6.1711 (11.359%) |
| Cyclohexane | 1.6107 | 1.5975 (0.821%) | 1.5849 (1.600%) | 1.5507 (3.728%) | 1.4995 (6.907%) |

Effect of the Thermal Diffusivity Ratio

Figure 8:
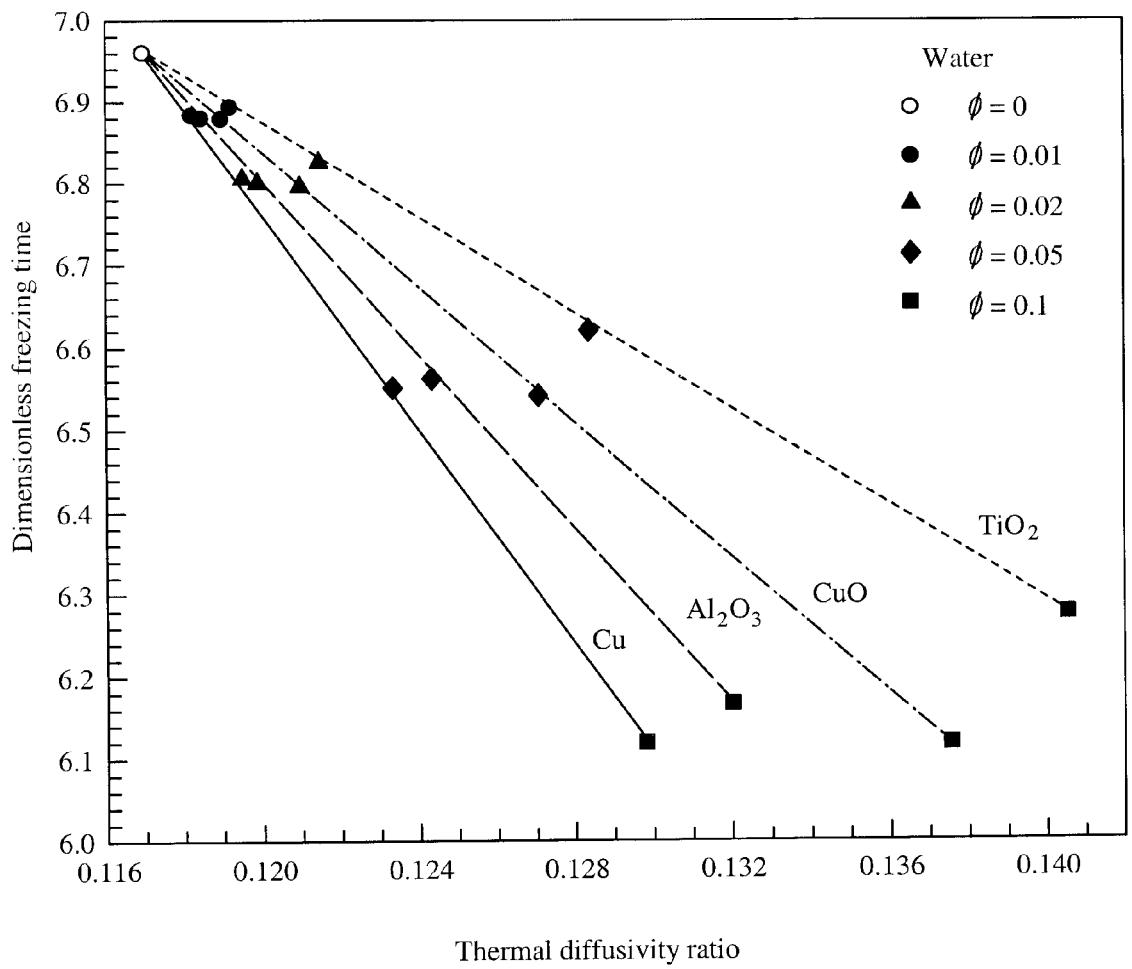
FIG. 8 illustrates a graph of freezing time versus thermal diffusivity ratio with water as a base PCM.
Figure 9:
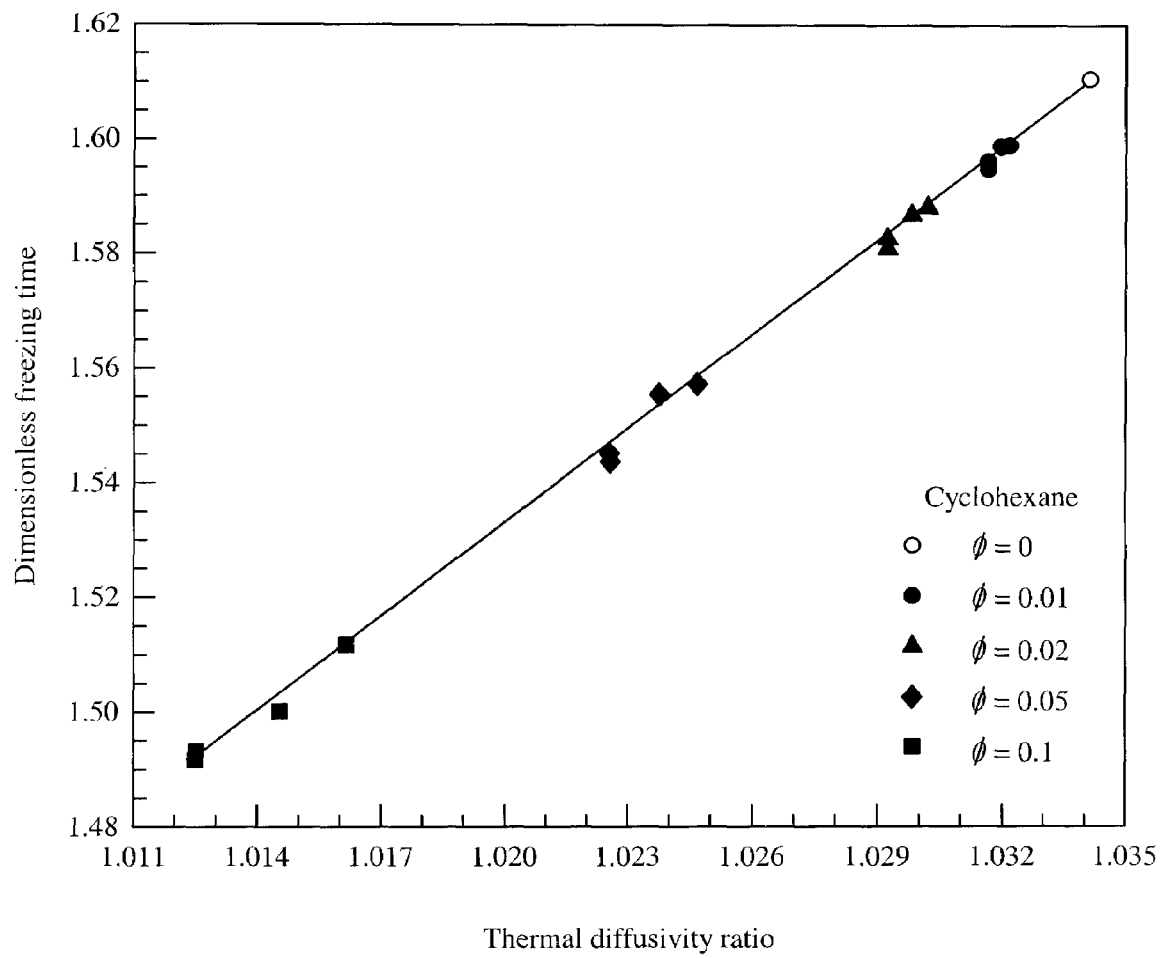
FIG. 9 illustrates a graph of freezing time versus thermal diffusivity ratio with cyclohexane as a base PCM.

The dimensionless freezing times of PCM/nanoparticle composites as a function of the thermal diffusivity ratio of the liquid to solid phases for water and cyclohexane as the base PCM are presented in FIGS. 8 and 9, respectively. In both figures, symbols similar to those in FIGS. 6 and 7 are used to identify the volume fraction of the suspended particles, whereas dashed lines are drawn to identify the specific PCM/nanoparticle composite. With water as the base PCM (FIG. 8), the observed trends for the variation of the dimensionless freezing time in relation to the thermal diffusivity ratio are analogous to what was discussed earlier in relation to effect of the thermal conductivity ratio. However, for cyclohexane composites the increasing trends of the thermal diffusivity ratio with greater loading of the particles is reversed. This is attributed to the opposite trends of both density and constant pressure specific heat when the PCM transforms from the liquid state to the solid phase. For water, both its density and specific pressure decrease upon freezing, whereas for cyclohexane these properties increase upon phase change. It is also noted that various curves for different types of suspended particles collapse onto each other. Regardless of the opposite trends exhibited by cyclohexane, expedited freezing that is afforded to the suspension of particles and its direct relation to the volume fraction of the particles are maintained.

Expedited Energy Discharge

Figure 10:
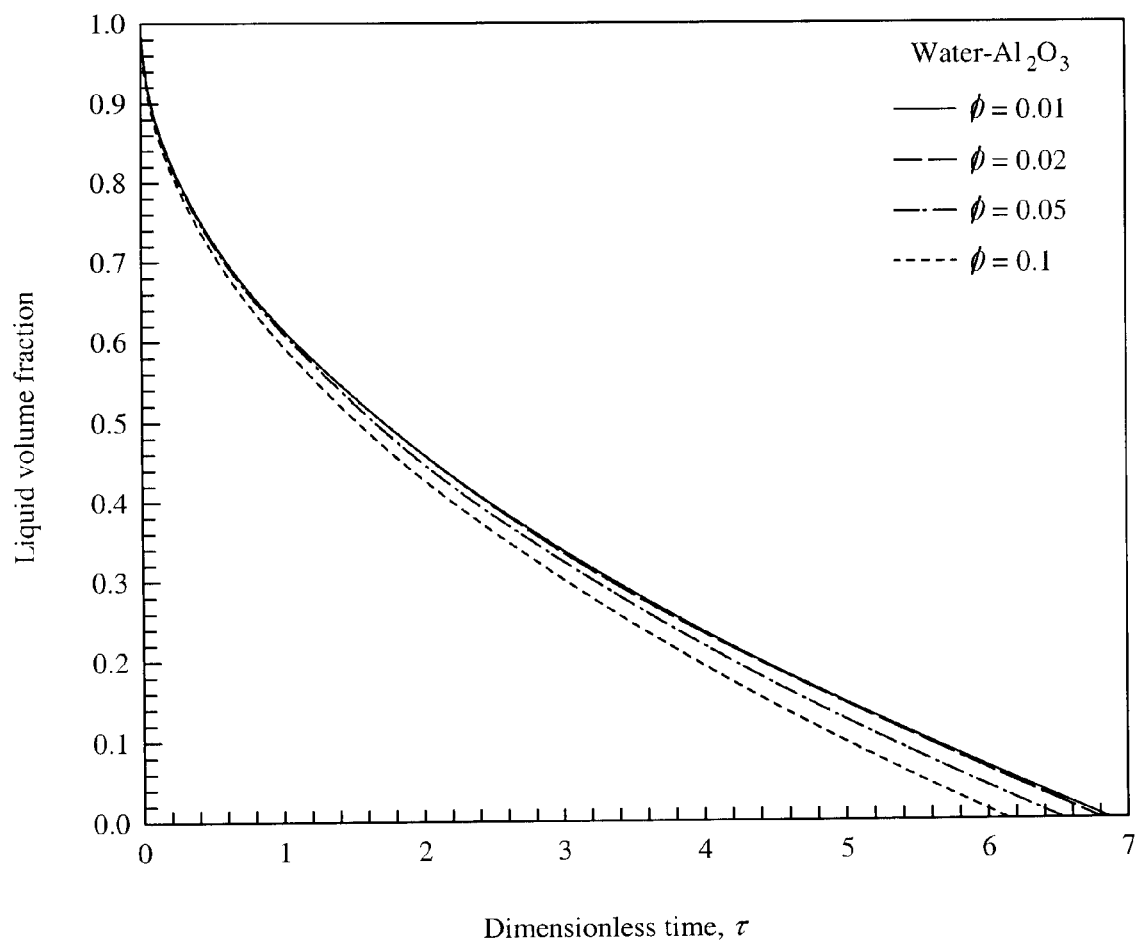
FIG. 10 illustrates a graph of time histories of energy discharge from the thermal storage system.

Time histories of energy discharge from the thermal storage system that was studied are given in FIG. 10. The fraction of the liquid composite as a function of the elapsed time is plotted as a function of the volume fraction of the suspended alumina particle in water. The expedited nature of the energy discharge exhibited by this representative NEPCM system points to its potential as a superior thermal energy storage system.

Conclusions

Based on results on an analytic/integral formulation of a 1-D freezing problem of water and cyclohexane/nanoparticle composites systems in a finite slab, the following conclusions are drawn. As the volume fraction of the suspended nanoparticles is raised, the thermal conductivity ratio of the liquid to solid for the composites increases. Water and cyclohexane exhibited opposite trends for dependence of the thermal diffusivity ratio of the liquid to solid in relation to introduction of more suspended particles. This is linked to the opposite trends of both density and specific heat when the PCM undergoes phase transition. For a given base PCM and constant value of the volume fraction, the dimensionless freezing time is nearly constant and independent of the suspended material. Introduction of suspended particles in water and cyclohexane gave rise to expedited freezing times as high as 11.36 percent.

Dodecane and Gel Oil

A dodecane nanofluid was prepared and it contains 1% wt CuO nanoparticles. A gel oil was prepared by the same way as that of the dodecane nanofluid. The weight percentage of CuO nanoparticles was also 1% wt. Both experienced 30 cycles of melting and freezing.

The freezing process was conducted in a home refrigerator. The freezing time was 1 hour, and it was the same for the two samples.

It has been observed that as the number of the freezing and melting cycle's increases there was an increase in the rate of the sedimentation for the dodecane nanofluid. As for the gel oil, it at least visually seems to be stable. Thus, the same procedure is able to be implemented to produce NEPCMS.

Applications

Metal nanoparticles such as copper, aluminum, copper oxide, aluminum oxide, titanium oxide and others are able to be added to a phase change material such as water or cyclohexane to form nanoparticle-enhanced phase change materials (NEPCM). In some embodiments, non-metal nanoparticles are used. The nanoparticles and phase change material form a stable suspension. Further, the NEPCM is able to be used in many cycles such as frozen, thawed, frozen, thawed and repeated. As described above, the NEPCM has a higher thermal conductivity than the PCM itself since the particles enhance the exchange of heat. Other chemicals are able to be added to further enhance a feature or provide an added feature.

The NEPCM is able to remain a free-form such that it is able to be shaped in any form or acquire the shape of its container. This is in contrast to solid slabs which are unable to be shaped. In some embodiments, the NEPCM is able to be frozen and shaped such as by freezing it in a mold. In some embodiments, the NEPCM is placed in an enclosure such as a plastic bead, a thin sheet enclosure or other types of enclosures.

An application includes the NEPCM enclosed within very thin sheets of a material such as plastic to be able to place the NEPCM on/within a dashboard of a vehicle or on/within the seat to provide thermal comfort. For example, within the dashboard, the NEPCM is able to provide insulation to keep the vehicle cooler when the ambient temperature outside is hot and warmer in when the ambient temperature outside is cold.

Another application includes packaging the NEPCM in an encapsulated form such as small plastic balls (e.g. 2-3 mm or 2-3 μm). The plastic balls are able to be added to building materials such as sheet rock or walls, floor tiles, ceiling tiles, roof tiles or any other material.

Another application includes textile, by incorporating the NEPCM in textiles such as in clothing. For example, the NEPCM is able to be contained in footwear, handwear, jackets, headwear, blankets or other similar items. The NEPCM will help keep a user warmer in colder weather by retaining more heat and keeping cold out. Similarly, the NEPCM is able to be used in hot weather by retaining a cool temperature and keeping heat out.

Yet another application is related to batteries and other vehicle component thermal management.

Appliances such as refrigerators are able to contain a form of the NEPCM inside the insulation. Cellular phones, computers and other electronic devices are also able to contain a form of the NEPCM to help regulate heat.

The NEPCM is also able to be used as a cover for cans and bottles such as a cover for soda cans to keep the soda cold on a hot day. The NEPCM is also able to be used in thermos containers to keep coffee hot on a cold day.

Although some example applications have been described herein, there are many other possible applications as well.

FIG. 11 illustrates a nanoparticle-enhanced phase change material (NEPCM) 1100. The NEPCM includes nanoparticles 1102 such as copper, aluminum, copper oxide, aluminum oxide and titanium oxide. The NEPCM also includes a phase change material 1104 such as water or cyclohexane. The NEPCM 1100 is able to store thermal energy much better than the phase change material alone. As described above, the NEPCM 1100 is able to be used in many applications.

FIG. 12 illustrates an exemplary contained nanoparticle-enhanced phase change material (NEPCM) 1200. The NEPCM 1200 includes nanoparticles 1202 such as copper, aluminum, copper oxide, aluminum oxide and titanium oxide. The NEPCM 1200 also includes a phase change material 1204 such as water or cyclohexane. The NEPCM 1200 is stored in a bead enclosure 1206. The bead enclosure 1206 is able to be any size. The bead enclosure 1206 is able to be made of any material such as plastic, rubber, metal, glass or anything else. The bead enclosure 1206 is able to be embedded in any object such as a wall, tile, textile or other object.

FIG. 13 illustrates an exemplary contained nanoparticle-enhanced phase change material (NEPCM) 1300. The NEPCM 1300 includes nanoparticles 1302 such as copper, aluminum, copper oxide, aluminum oxide and titanium oxide. The NEPCM 1300 also includes a phase change material 1304 such as water or cyclohexane. The NEPCM 1300 is stored in a flat enclosure 1306. The flat enclosure 1306 is able to be any size. The flat enclosure 1306 is able to be made of any material such as plastic, rubber, metal, glass or anything else. The flat enclosure 1306 is able to be embedded in any object such as a wall, tile, textile or other object.

FIG. 14 illustrates a flowchart of a method of utilizing an NEPCM. In the step 1400, nanoparticles and phase change material are combined, for example, by adding nanoparticles to the phase change material to form the NEPCM. In some embodiments, the nanoparticles are copper, aluminum, copper oxide, aluminum oxide, titanium oxide, other appropriate nanoparticles or a combination thereof. In some embodiments, the phase change material is water, cyclohexane, dodecane, gel oil, another appropriate material or a combination thereof. In some embodiments, combining the nanoparticles and phase change material includes additional sub-steps such as mixing, heating, cooling and/or other processes. In some embodiments, in the step 1402, the NEPCM is inserted into an enclosure such as beads, a flat enclosure, a square enclosure, a tube enclosure or another type of enclosure. Inserting the NEPCM includes closing the enclosure so that the NEPCM is securely enclosed. In some embodiments, in the step 1404, the enclosure containing the NEPCM is inserted into an object such as a tile, an article of clothing or another object. In some embodiments, instead of inserting the enclosure into the object, the enclosure is positioned on or near the object. The steps 1402 and 1404 are optional depending on the embodiment. If the end product is the NEPCM, then the steps 1402 and 1404 are able to be skipped. If the end product is the NEPCM in an enclosure, then the step 1404 is able to be skipped.

Figure 15:
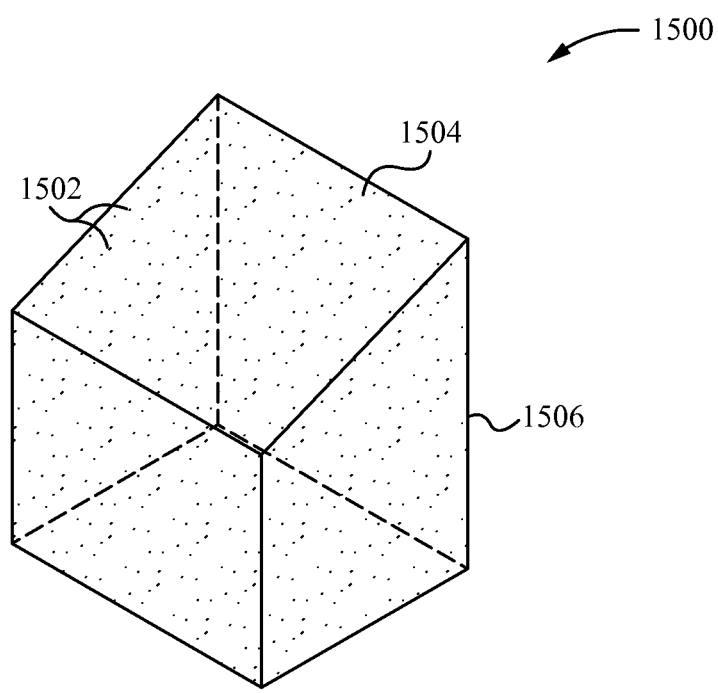
FIG. 15 illustrates an exemplary contained nanoparticle-enhanced phase change material.

FIG. 15 illustrates an exemplary contained nanoparticle-enhanced phase change material (NEPCM) 1500. The NEPCM 1500 includes nanoparticles 1502 such as copper, aluminum, copper oxide, aluminum oxide and titanium oxide. The NEPCM 1500 also includes a phase change material 1504 such as water or cyclohexane. The NEPCM 1500 is stored in a three-dimensional square enclosure 1506 such as a cube or rectangular prism. The square enclosure 1506 is able to be any size. The square enclosure 1506 is able to be made of any material such as plastic, rubber, metal, glass or anything else. The square enclosure 1506 is able to be embedded in any object such as a wall, tile, textile or other object.

Figure 16:
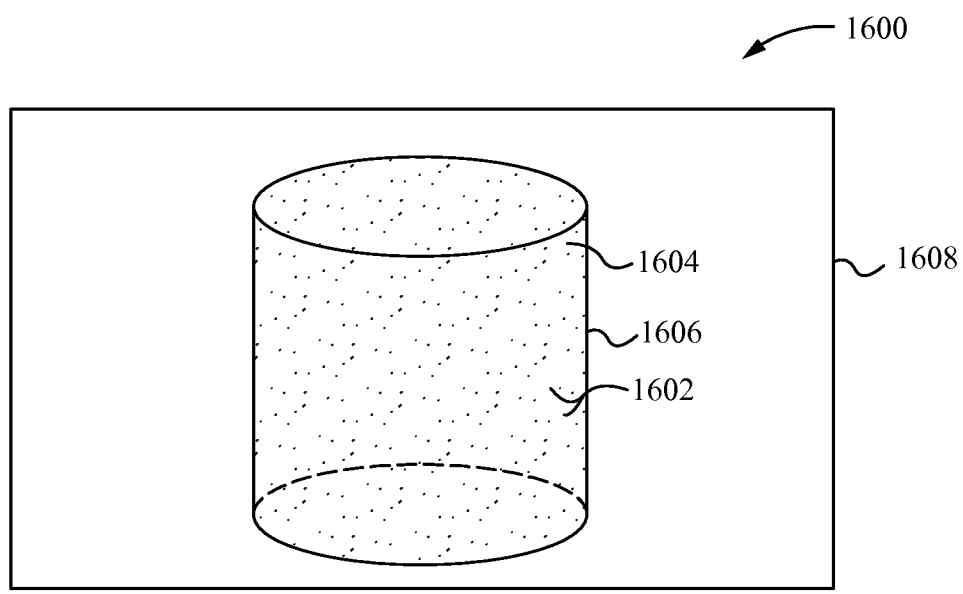
FIG. 16 illustrates an exemplary contained nanoparticle-enhanced phase change material.

FIG. 16 illustrates an exemplary contained nanoparticle-enhanced phase change material (NEPCM) 1600. The NEPCM 1600 includes nanoparticles 1602 such as copper, aluminum, copper oxide, aluminum oxide and titanium oxide. The NEPCM 1600 also includes a phase change material 1604 such as water or cyclohexane. The NEPCM 1600 is stored in a tube enclosure 1606. The tubular enclosure 1606 is able to be any size. The tubular enclosure 1606 is able to be made of any material such as plastic, rubber, metal, glass or anything else. The tube enclosure 1606 is able to be embedded in any object such as a wall, tile, textile or other object. The tubular enclosure is stored or contained in an object 1608. The object 1608 is able to be construction material, clothing, automobile components, furniture, appliances, electronics or other types of containers as are well known in the art.

To utilize the NEPCM, as described above, there are many different implementations. After the NEPCM is inserted into an enclosure, the enclosure is able to be used in various materials and/or objects. Once the materials/objects contain the enclosed NEPCM, they provide better energy storage including retaining heat or cold.

In operation, the NEPCM stores thermal energy extremely well. The NEPCM is able to store hot or cold energy so that regardless of what kind of energy comes in contact with the NEPCM, the energy is stored within the NEPCM. Furthermore, the NEPCM is able to store significant spikes of energy. In some instances, the NEPCM is able to act similar to insulation. Since the NEPCM is free-form, it is able to take any shape unlike solid implementations. These features of NEPCM enable it to be used in many different applications including automobile, textile, household and many others.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A free-form composition for improving thermal energy storage, the composition comprising:
   a. nanoparticles, wherein the nanoparticles comprise a volume fraction of the composition ranging from greater than 0.03 to equal to or less than 0.2; and
   b. a phase change material.

2. The composition of claim 1 wherein the nanoparticles are selected from the group consisting of copper, aluminum, copper oxide, aluminum oxide and titanium oxide.

3. The composition of claim 1 wherein the phase change material is selected from the group consisting of water, cyclohexane, dodecane and oil.

4. A system for improving thermal energy storage comprising:
   a. a solution comprising nanoparticles and a phase change material, wherein the nanoparticles comprise a volume fraction of the solution ranging from greater than 0.03 to equal to or less than 0.2; and
   b. a storage mechanism for storing the solution.

5. The system of claim 4 wherein the nanoparticles are selected from the group consisting of copper, aluminum, copper oxide, aluminum oxide and titanium oxide.

6. The system of claim 4 wherein the phase change material is selected from the group consisting of water, cyclohexane, dodecane and oil.

7. The system of claim 4 wherein the solution is free-form.

8. The system of claim 4 wherein the shape of the storage mechanism is selected from the group consisting of a bead, a flat enclosure having at least one cross-section with a height that is smaller than the width of the cross-section creating a flat profile, a square enclosure having at least one cross-section with a height and a width that are the same creating a square profile and a tubular enclosure.

9. The system of claim 4 wherein a material of the storage mechanism is selected from the group consisting of plastic, rubber, metal and glass.

10. A system including improved thermal energy storage comprising:
    a. a solution comprising nanoparticles and a phase change material, wherein the nanoparticles comprise a volume fraction of the solution ranging from greater than 0.03 to equal to or less than 0.2;
    b. a storage mechanism configured for storing the solution; and
    c. an object containing the storage mechanism.

11. The system of claim 10 wherein the nanoparticles are selected from the group consisting of copper, aluminum, copper oxide, aluminum oxide and titanium oxide.

12. The system of claim 10 wherein the phase change material is selected from the group consisting of water, cyclohexane, dodecane and oil.

13. The system of claim 10 wherein the solution is free-form.

14. The system of claim 10 wherein the shape of the storage mechanism is selected from the group consisting of a bead, a flat enclosure having at least one cross-section with a height that is smaller than the width of the cross-section creating a flat profile, a square enclosure having at least one cross-section with a height and a width that are the same creating a square profile and a tubular enclosure.

15. The system of claim 10 wherein a material of the storage mechanism is selected from the group consisting of plastic, rubber, metal and glass.

16. The system of claim 10 wherein the object is selected from the group consisting of construction material, clothing, automobile components, furniture, appliances, electronics and containers.

17. A free-form composition for improving thermal energy storage, the composition consisting of:
    a. nanoparticles; and
    b. a homogenous phase change material.

* * * * *